US007745018B2

(12) United States Patent
Murasko et al.

(10) Patent No.: US 7,745,018 B2
(45) Date of Patent: Jun. 29, 2010

(54) ILLUMINATED DISPLAY SYSTEM AND PROCESS

(75) Inventors: Matthew M. Murasko, Manhattan Beach, CA (US); Patrick J. Kinlen, Fenton, MO (US)

(73) Assignee: Lumimove, Inc., St. Louis, MO (US)

(*) Notice: Subject to any disclaimer, the term of this patent is extended or adjusted under 35 U.S.C. 154(b) by 864 days.

(21) Appl. No.: 11/269,225

(22) Filed: Nov. 8, 2005

(65) Prior Publication Data

US 2006/0269744 A1 Nov. 30, 2006

Related U.S. Application Data

(60) Continuation of application No. 10/977,104, filed on Oct. 29, 2004, now abandoned, which is a division of application No. 10/104,161, filed on Mar. 22, 2002, now Pat. No. 6,811,895.

(60) Provisional application No. 60/277,829, filed on Mar. 22, 2001.

(51) Int. Cl.
*H01J 1/63* (2006.01)
*H01J 1/62* (2006.01)
*C09K 11/06* (2006.01)

(52) U.S. Cl. ....................... 428/690; 428/917; 313/504; 313/506

(58) Field of Classification Search ................. 428/690, 428/917; 313/502–509; 427/58, 66; 257/40, 257/88–103, E51.001–E51.052; 252/301.16–301.35
See application file for complete search history.

(56) References Cited

U.S. PATENT DOCUMENTS 1,163,637 A 12/1915 Beckwith
2,090,248 A 8/1937 Chakow ........................ 240/4
2,924,732 A 2/1960 Lehmann .................... 313/108
3,007,070 A 10/1961 Cargill, Jr. .................. 313/108
3,052,810 A 9/1962 Mash ......................... 313/108

(Continued)

FOREIGN PATENT DOCUMENTS

DE 3042159 A1 6/1982

(Continued)

OTHER PUBLICATIONS

Abstract of EP 0 166 534 A1.

(Continued)

*Primary Examiner*—D. Lawrence Tarazano
*Assistant Examiner*—Camie S Thompson
(74) *Attorney, Agent, or Firm*—Nelson Mullins; Riley & Scarborough, LLP

(57) ABSTRACT

An Illuminated display integrated with a fabric substrate, comprising a rear electrode formed on a portion of a front surface of the fabric substrate, the rear electrode being formed on the fabric substrate portion by applying a catalyst to the fabric portion and subsequently immersing the fabric portion in an electroless plating bath followed by immersing the fabric portion in an electrode bath, a dielectric layer formed onto the fabric substrate surface substantially over the rear electrode, a light emitting layer formed onto the dielectric layer, a transparent conductive layer formed onto the light emitting layer; and a front electrode lead electrically connected to the transparent conductive layer to transport energy thereto.

10 Claims, 5 Drawing Sheets

U.S. PATENT DOCUMENTS 3,274,419 A * 9/1966 Roth .......................... 313/503
3,317,722 A 5/1967 Whitney .................... 240/2.25
3,358,137 A 12/1967 Sinclair et al. ................ 240/60
3,458,420 A 7/1969 Herbert et al. .............. 428/457
3,581,308 A 5/1971 McNaney ................... 340/380
3,619,714 A 11/1971 Evans et al. ................. 315/169
3,648,235 A 3/1972 Cahill ........................ 340/110
3,793,517 A 2/1974 Carlini ........................ 240/60
4,010,032 A 3/1977 Ono et al. ...................... 96/31
4,020,389 A 4/1977 Dickson et al. ............. 315/246
4,090,232 A 5/1978 Golden ....................... 362/106
4,138,620 A 2/1979 Dickson ........................ 313/1
4,143,297 A 3/1979 Fischer ....................... 313/502
4,143,404 A 3/1979 Armstrong et al. .......... 358/253
4,195,328 A 3/1980 Harris, Jr. .................... 362/72
4,225,408 A 9/1980 Barlow et al. ........... 204/181 N
4,234,907 A 11/1980 Daniel ......................... 362/32
4,263,339 A 4/1981 Fischer ........................ 427/64
4,266,164 A 5/1981 Schroeder ................ 315/169.1
4,319,308 A 3/1982 Ippoliti et al. ............... 362/106
4,480,293 A 10/1984 Wells ......................... 362/108
4,486,487 A 12/1984 Skarp ......................... 428/216
4,559,586 A 12/1985 Slarve ........................ 362/106
4,570,206 A 2/1986 Deutsch ...................... 362/103
4,571,350 A 2/1986 Parker et al. ................ 427/109
4,617,195 A 10/1986 Mental ........................ 427/66
4,626,742 A 12/1986 Mental ....................... 313/503
4,645,970 A 2/1987 Murphy ...................... 313/509
4,652,981 A 3/1987 Glynn ........................ 362/103
4,667,274 A 5/1987 Daniel ........................ 362/106
4,709,307 A 11/1987 Branom ...................... 362/103
4,748,375 A 5/1988 Lindmayer .................. 313/509
4,803,402 A 2/1989 Raber et al. ................. 313/509
4,829,213 A 5/1989 Pecile et al. ................ 313/509
4,855,189 A 8/1989 Simopoulos et al. ........ 428/690
4,855,190 A 8/1989 Bezner ....................... 428/690
4,857,416 A 8/1989 Kreiling et al. ............. 428/690
4,862,331 A 8/1989 Hanabusa ................... 362/106
4,875,144 A 10/1989 Wainwright ................ 362/103
4,877,995 A 10/1989 Thioulouse et al. ......... 313/507
4,887,003 A 12/1989 Parker ........................ 313/634
4,891,736 A 1/1990 Gouda ........................ 362/105
4,893,356 A 1/1990 Waters ....................... 2/171.3
4,901,211 A 2/1990 Shen .......................... 362/106
4,904,901 A 2/1990 Simopoulos et al. ........ 313/509
4,945,458 A 7/1990 Batts et al. .................. 362/106
D310,434 S 9/1990 Breece ........................ D29/10
4,956,752 A 9/1990 Foglietti ...................... 362/72
4,999,936 A 3/1991 Calamia et al. ............... 40/544
5,005,306 A 4/1991 Kinstler ....................... 40/591
5,019,438 A 5/1991 Rapisarda ................... 428/102
5,040,099 A 8/1991 Harris ......................... 362/72
5,051,654 A 9/1991 Nativi et al. ................ 313/506
5,067,063 A 11/1991 Granneman et al. ......... 362/156
5,111,366 A 5/1992 Rife et al. ..................... 362/31
D326,924 S 6/1992 Carroll ....................... D26/39
5,121,234 A 6/1992 Kucera ........................ 359/50
5,122,939 A 6/1992 Kazdan et al. .............. 362/243
5,128,844 A 7/1992 Landais ...................... 362/105
5,138,539 A 8/1992 Honda et al. ................ 362/221
5,151,678 A 9/1992 Veltri et al. ................. 340/321
5,198,723 A 3/1993 Parker ........................ 313/634
5,211,822 A 5/1993 Alary et al. ............ 210/500.23
5,293,098 A 3/1994 Brownell ................. 315/169.3
5,295,036 A 3/1994 Yagi et al.
5,317,488 A 5/1994 Penrod ........................ 362/84
5,319,282 A 6/1994 Winsor .................... 315/169.4
5,352,951 A 10/1994 Kardon et al. .............. 313/502
5,400,047 A 3/1995 Beesely ...................... 313/503
5,426,792 A 6/1995 Murasko ........................ 2/422
5,466,990 A 11/1995 Winsor ........................ 315/56
5,469,019 A 11/1995 Mori .......................... 313/509
5,469,020 A 11/1995 Herrick ...................... 313/511
5,491,377 A 2/1996 Janusauskas ................ 313/506
5,497,572 A 3/1996 Hoffman ..................... 40/544
5,502,357 A 3/1996 Kimball .................. 315/209 R
5,518,561 A 5/1996 Rosa .......................... 156/71
5,533,289 A 7/1996 Hoffman ..................... 40/544
5,552,679 A 9/1996 Murasko ................. 315/169.3
5,565,733 A 10/1996 Krafcik et al. .............. 313/510
5,568,016 A 10/1996 Beard ...................... 315/169.3
5,572,817 A 11/1996 Chien .......................... 40/544
5,597,183 A 1/1997 Johnson ....................... 283/83
5,634,411 A 6/1997 Chasan ....................... 108/153
5,652,067 A 7/1997 Ito et al. ..................... 428/690
5,663,573 A 9/1997 Epstein et al. ................ 257/40
5,667,417 A 9/1997 Stevenson .................... 445/24
5,667,724 A 9/1997 Petersen .............. 252/301.6 R
5,697,175 A 12/1997 Schwartz ..................... 40/552
5,697,305 A 12/1997 Chasan et al. ............... 108/153
5,703,436 A 12/1997 Forrest et al. ............... 313/506
5,748,271 A 5/1998 Hikmet et al.
5,814,947 A 9/1998 Brownell ................. 315/169.3
5,853,905 A 12/1998 So et al. ..................... 428/690
5,856,029 A 1/1999 Burrows ..................... 428/690
5,856,030 A 1/1999 Burrows ..................... 428/690
5,856,031 A 1/1999 Burrows ..................... 428/690
5,911,496 A 6/1999 Hojnacki .................... 362/131
5,912,533 A 6/1999 Lee et al. .................... 313/503
5,957,564 A 9/1999 Bruce et al. ................... 362/84
5,965,981 A 10/1999 Inoguchi et al. ............. 313/506
5,976,613 A 11/1999 Janusauskas ................. 427/66
5,980,976 A 11/1999 Burrows ...................... 427/66
6,013,985 A 1/2000 Green et al. ................ 315/149
6,023,371 A 2/2000 Onitsuka et al. ............ 359/620
6,031,468 A 2/2000 Tsao et al. .................. 340/908
6,050,010 A 4/2000 Garcia et al. ............. 40/124.02
6,060,838 A 5/2000 Cantoni et al. .............. 315/159
6,069,444 A 5/2000 Krafcik et al. .............. 313/510
6,107,213 A 8/2000 Tayanaka .................... 438/762
6,116,745 A 9/2000 Yei ........................... 362/105
6,137,221 A 10/2000 Roitman et al. ............. 315/504
6,157,138 A 12/2000 Anderson ................ 315/169.3
6,168,283 B1 1/2001 Howell ........................ 362/84
6,203,391 B1 3/2001 Murasko ...................... 445/24
6,205,690 B1 3/2001 Heropoulos et al. ........... 40/442
6,215,225 B1 4/2001 Ishikawa et al.
6,261,633 B1 7/2001 Burrows ..................... 427/123
6,262,531 B1 7/2001 Inoguchi et al. ............. 313/506
6,310,589 B1 10/2001 Nishigaki et al. ............. 345/76
6,322,859 B1 11/2001 Pluim et al. ................. 427/585
6,329,766 B1 12/2001 Liu et al.
6,353,291 B1 3/2002 Borgogno et al. ........ 315/169.3
6,358,437 B1 * 3/2002 Jonas et al. ................. 252/500
6,406,803 B1 6/2002 Abe et al. ................... 428/690
6,424,088 B1 7/2002 Murasko ..................... 313/506
6,489,045 B1 12/2002 Araki et al. ................. 428/690
6,498,049 B1 12/2002 Friend et al. .................. 438/34
6,511,198 B1 1/2003 Erickson ..................... 362/103
6,559,449 B2 5/2003 Ikeda et al. ................. 250/361
6,610,223 B2 8/2003 Lee .............................. 264/9
6,611,109 B2 8/2003 Zovko et al. ............. 315/169.3
6,613,455 B1 9/2003 Matsumoto et al. ......... 428/690
6,706,551 B2 3/2004 Andriessen .................. 438/99
6,751,898 B2 6/2004 Heropoulos et al. ........... 40/544
6,777,724 B2 8/2004 Duggal et al. ............... 257/184
6,798,133 B1 9/2004 Ambrugger et al.
6,903,505 B2 6/2005 McNulty et al. ............ 313/504
6,916,553 B2 * 7/2005 Willaert et al. .............. 428/690

FOREIGN PATENT DOCUMENTS

EP 0 166 534 A1 1/1986
EP 0 881 863 A2 2/1998

| | | | |
|---|---|---|---|
| FR | 1.401.264 | | 4/1965 |
| GB | 2 107 039 A | | 4/1983 |
| WO | WO 96/29747 | | 9/1996 |
| WO | 98/30069 A1 | | 7/1998 |
| WO | 99/06157 A1 | | 2/1999 |
| WO | WO 9934371 | * | 7/1999 |
| WO | WO 99/39553 | | 8/1999 |
| WO | 01/18886 A2 | | 3/2001 |

OTHER PUBLICATIONS

Abstract of GB 2 107 039 A.

U.S. Patent Application No. 2002/0011786 A1, Jan. 31, 2002.

Let There Be Light: Screen Printing EL Lamps for Membrane Switches, Screenprinting, Graphics and Industrial Printing, dated Jan. 1999, 5 pages.

Processing Guide for DuPont Luxprint Electroluminescent Inks, DuPont Photopolymer & Electronic Materials, dated Nov. 1997, 6 pages.

Japanese Laid-Open Publication No. 10-335063.

Japanese National Phase PCT Laid Open-Publication No. 11-500574.

Abstract of EP0881863 for JP 10335063(A).

Abstract of EP0815598 for JP 1150074.

U.S. Patent and Trademark Office Non-Final Office Action mailed Mar. 21, 2008, U.S. Appl. No. 10/977,104, filed Mar. 21, 2008, Matthew Murasko, et al.

U.S. Patent and Trademark Office Non-Final Office Action/Restriction mailed Apr. 21, 2004, U.S. Appl. No. 10/104,161, filed Mar. 22, 2002, Matthew Murasko, et al.

Amendment to Restriction Requirement filed May 20, 2004 with the U.S. Patent and Trademark Office in response to the outstanding U.S. Patent and Trademark Office Non-Final Office Action/Restriction mailed Apr. 21, 2004, U.S. Appl. No. 10/104,161, filed Mar. 22, 2002, Matthew Murasko, et al.

U.S. Patent and Trademark Office Non-Final Office Action mailed Jul. 14, 2003, U.S. Appl. No. 10/104,161, filed Mar. 22, 2002, Matthew Murasko, et al.

Amendment filed Jan. 14, 2004 with U.S. Patent and Trademark Office in response to the outstanding U.S. Patent and Trademark Office Non-Final Office Action mailed Jul. 14, 2003, U.S. Appl. No. 10/104,161, filed Mar. 22, 2002, Matthew Murasko, et al.

Translation of Japanese Official Action dated Feb. 13, 2008 and mailed Feb. 15, 2008 for Japanese Patent Application No. 2002-575978 in the name of Lumimove, Inc.

Instructions to Japanese associate for preparation of and filing response with the Japanese Patent Office to the outstanding Japanese Offical Action dated Feb. 13, 2008 and mailed Feb. 15, 2008 for Japanese Patent Application No. 2002-575978 in the name of Lumimove, Inc.

Translation of Japanese Final Official Action dated Dec. 16, 2008 and mailed Dec. 24, 2008 for Japanese Patent Application No. 2002-575978 in the name of Lumimove, Inc.

Instructions to Japanese associate for preparation of and filing a Notice of Appeal, amended claims and a precautionary divisional application in response to the outstanding Japanese Final Official Action dated Dec. 16, 2008 and mailed Dec. 24, 2008 for Japanese Patent Application No. 2002-575978 in the name of Lumimovce, Inc.

Communication pursuant to Article 96(2) EPC dated May 6, 2006 for European Patent Application No. 02 721 557.3-2214 in the name of Lumimove, Inc.

Instructions to European associate for preparation of and filing amended claims in response to the outstanding Communication pursuant to Article 96(2) EPC dated May 6, 2005 for European Patent Application No. 02 721 557.3-2214 in the name Lumimove, Inc.

* cited by examiner

ILLUMINATED DISPLAY SYSTEM AND PROCESS

RELATED APPLICATIONS

This application is a continuation of U.S. patent application Ser. No. 10/977,104, filed Oct. 29, 2004, which was a divisional of U.S. patent application Ser. No. 10/104,161, filed Mar. 22, 2002, now issued as U.S. Pat. No. 6,811,895, which was a non-provisional of U.S. Provisional Patent Application No. 60/277,829, filed Mar. 22, 2001, each of which is incorporated herein by reference in its entirety.

BACKGROUND OF THE INVENTION

1. Field of the Invention

This invention relates generally to applications for using illuminated displays, and more particularly, for integrating electroluminescent light emitting panels with articles of fabric or textiles.

2. Problem

Electroluminescent (EL) panels or lamps provide illumination for a wide array of objects such as watches, vehicle instrument panels, computer monitors, etc. These EL panels are typically formed by positioning an electroluminescent material, such as phosphor, between two electrodes, one of which is essentially transparent. The electric field created by applying an electric current to the electrodes causes excitation of the electroluminescent material and emission of light therefrom, which is viewed through the transparent electrode. Advancements in materials science have led to the formation of EL panels from thin, elongate, flexible strips of laminated material having a variety of shapes and sizes.

It is desired to have an illuminated display integrated into a fabric or textile application, such that a light source can be created on clothing, backpacks, tents, signs, and the like. However, forming an electroluminescent panel onto fabric presents a particular challenge because of the flexible nature of fabric and the uses to which it is put, such as being worn as an article of clothing. Unlike an EL panel hung on a wall or in a window, electroluminescent panels attached to fabric must be put through repeated cycles of physical stress from flexion of the fabric, and must be properly electrically and thermally insulated due to the increased risk of being touched by a person or worn close to their body. Additionally, fabrics and textiles have generally proven to be difficult substrates upon which to build the component layers of an EL panel. What is needed is a process for better integrating an EL panel with a fabric section to form a unitary illuminated display system.

Electroluminescent film is commonly used in the display industry as back-lighting for liquid crystal displays. As constructed today, these films are not transparent, or even semi-transparent since the back electrode is either carbon or silver. It is thus also desirable to have a large area illumination source that is semi-transparent, i.e. it allows the observer to see an object through the back-side of the device while it is illuminating the object.

Solution

The present invention involves processes for reliably forming the component layers of an electroluminescent panel onto a fabric section to facilitate construction of the entire EL panel assembly. In one aspect, the layers of an electroluminescent panel are formed integral with a substrate section. First, a rear electrode made of a conductive polymer is formed onto a substrate section in a desired pattern. Then, a dielectric layer is formed over the rear electrode layer. A light emitting layer, transparent conductive layer made of a conductive polymer, and front electrode lead are then successively formed onto the substrate section; the light emitting layer atop the dielectric layer and the transparent conductive polymer layer atop the light emitting layer. Each of the component layers of the EL panel may be formed onto the substrate section by a printing process. Optionally, the substrate section can be adhered to a substantially rigid backing while the EL panel component layers are applied to aid in accurate placement of such layers. This aspect provides a construction where at least the rear electrode is more fully integrated with the substrate section. When an electric current is applied to the front and rear electrodes, an electric field is created to excite the light emitting layer to illuminate.

Another aspect of the present invention provides a process whereby the rear electrode of an EL panel is formed directly onto a fabric section using a metalization process. An image is first formed to define a specific design to be illuminated. The image is placed over a fabric section to define an area for display and a catalyst is applied to such display area. Next, the portion of the fabric section with catalyst applied thereto is immersed in an electroless plating bath and subsequently removed, which allows a chemical reduction to occur in the aqueous solution. Finally, the fabric section display area is immersed in an electrode bath to form an electrode layer that is integrated with the fabric section and patterned in the associated image. The rest of the layers of the EL panel, including a front electrode, may be formed on top of the rear electrode and base fabric section by, for example, a printing process. Upon energizing the EL panel, a light emitting layer will illuminate in the pattern of the image.

In still another aspect of the present invention, an insulative layer and a process for forming thereof is provided to encapsulate a fabric section having a rear electrode. The fabric section is first immersed in electrophoretic liquid. An electrical lead is connected to the rear electrode and a counter electrode is immersed in the liquid and connected to an electrical lead of opposite polarity. Upon a voltage being applied to the electrical leads, an insulative conformal coating is deposited on the fabric section immersed in the electrophoretic liquid. This coating maintains the integrity of the rear electrode and electrically insulates such electrode, thereby mitigating the risk of electrical shock for a person touching the fabric. Furthermore, the coating may serve as the dielectric layer of the electroluminescent panel. A printing process or other means may be used to form the remaining layers of an EL panel on top of the dielectric layer.

By these processes, safer, more durable illuminated display systems can be manufactured for all types of fabric and textile applications, such as safety clothing (vests, jackets, hats, gloves), outdoor gear (tents, backpacks, etc.), flags and signs, or any other application requiring a flexible illumination solution. Additionally, because the EL panel components of the illuminated display system may be formed together as thin layers by, for example, a printing process, thin EL lamps may be formed that are not too bulky or cumbersome to be worn on an article of clothing. As opposed to reflective strips, the illuminated displays systems formed by these processes do not require light to be reflected off of an EL panel surface from external light sources. Other advantages and components of the present invention will become apparent from the following description taken in conjunction with the accompanying drawings, which constitute a part of this specification and wherein are set forth exemplary embodiments of the present invention to illustrate various features thereof.

DETAILED DESCRIPTION OF THE INVENTION

The present invention provides a series of processes for forming electroluminescent panel components onto substrates, preferably textiles and fabrics, to create illuminated display systems. In addition, certain components of the display system may be formed together as disclosed in U.S. Pat. No. 6,203,391 of Murasko, the teachings of which are incorporated by reference herewith. The '391 patent discloses processes for forming electroluminescent signs by combining electroluminescent lamp components with a sign substrate.

Conductive Polymer Illuminated Display

Figure 1:
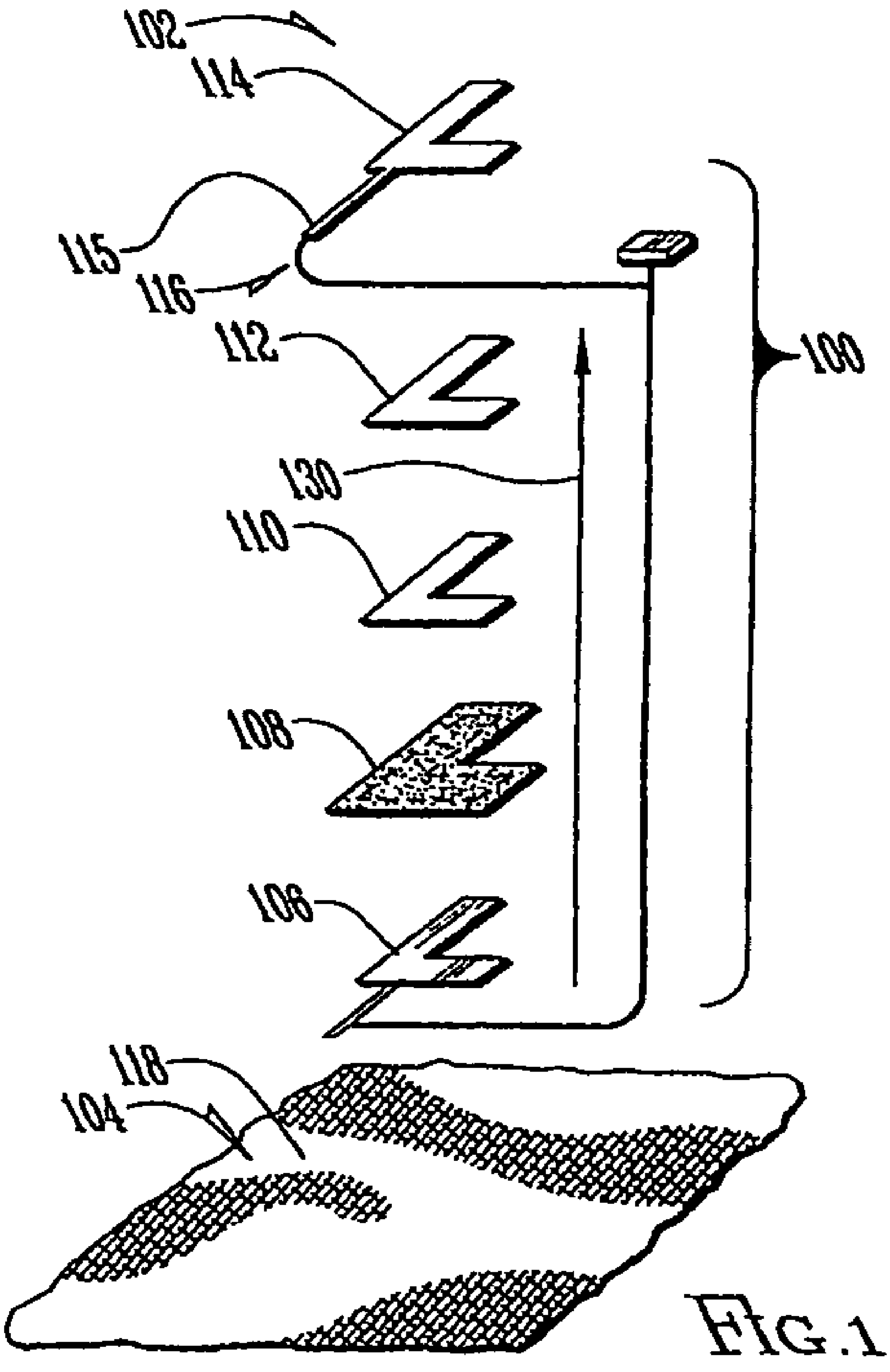
FIG. 1 is a diagram of an illuminated display system in accordance with an embodiment of the present invention.

FIG. 1 presents an aspect of the present invention whereby a conductive polymer is used to form the conductive elements of an electroluminescent panel. This construction serves to better integrate the EL panel with a substrate to form an illuminated display system 100. Conductive polymers that may be used with EL panel 102 include polyaniline, polypyrrole, and preferably, polyethylene-dioxithiophene, which is available under the trade name "Orgacon" from Agfa Corp. of Ridgefield Park, N.J. Substrate 104 forms the base layer upon which EL panel component layers are formed. Preferably, substrate 104 is a fabric or textile section such that the conductive polymer material can be at least partially absorbed into the fabric fibers, forming a more integral structure. Suitable fabric or textile materials include cotton, nylon, polyester, high-density polyethylene (e.g., Tyvek brand from DuPont Company of Wilmington, Del.), and the like. All of these materials are hereinafter referred to as "fabric". EL panel 102 comprises a conductive polymer rear electrode 106, a dielectric layer 108, a light emitting layer 110, a front conductive polymer layer 112, and a front electrode lead 114. Optionally, conductive pads 116 are electrically connected to conductive lead 114 and conductive polymer rear electrode 106 to bring electrical energy to EL panel 102 from a power source to cause light emitting layer 110 to illuminate. Also, front electrode lead 114 is preferably a conductive polymer front outlying electrode lead disposed substantially around the perimeter of front conductive polymer layer 112.

Dielectric layer 108 is formed of a high dielectric constant material, such as barium titanate. Light emitting layer 110 is formed of materials that illuminate upon being positioned in an electric field. Such materials may include non-organics, such as phosphor, or organics such as light emitting polymers, as taught in U.S. patent application Ser. No. 09/815,078, filed Mar. 22, 2001, for an "Electroluminescent Multiple Segment Display Device", the teachings of which are incorporated by reference herewith. Conductive pads 116 are preferably made of silver, but may be fabricated from any conductive material from which a reliable electrical connector can be formed.

Figure 2:
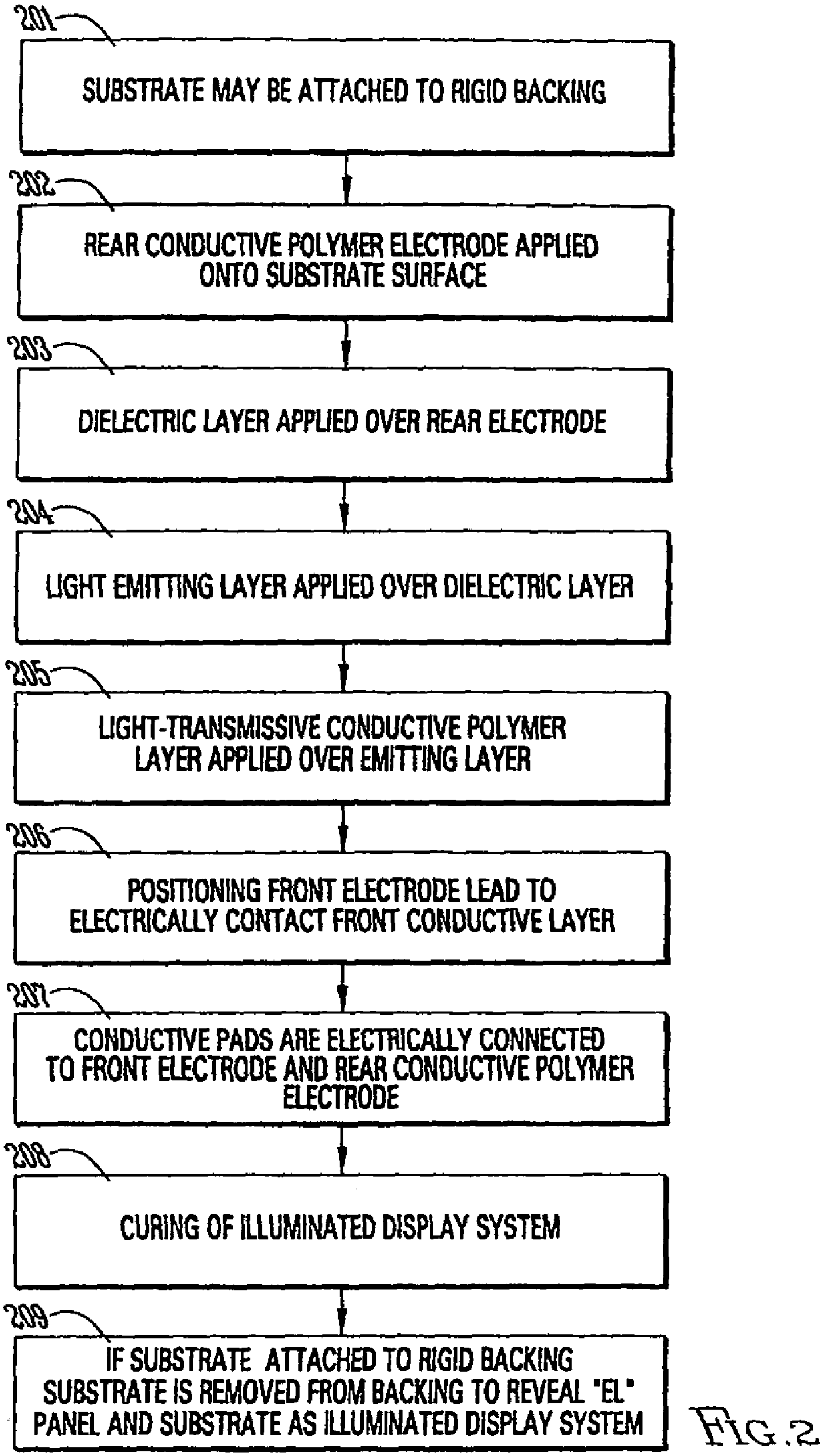
FIG. 2 is a flowchart illustrating an exemplary process for forming the illuminated display system in accordance with an embodiment of the present invention.

FIG. 2 is a flow chart showing an exemplary sequence of steps for fabricating the electroluminescent panel 102 onto the substrate 104 to form the illuminated display system 100 shown in FIG. 1. Each of the component layers 106-116 of EL panel 102 may be successively applied onto substrate 104 by a variety of means, including stenciling, flat coating, brushing, rolling, and spraying, but preferably are printed onto the substrate by screen or ink jet printing.

If the chosen substrate 104 is made of a flexible material, such as a fabric, substrate 104 is preferably attached to a rigid backing (not shown) using an adhesive before EL panel 102 is built thereon, as shown at step 201. The backing may be of a material such as aluminum, polycarbonate, cardboard, and the like. The adhesive must provide sufficient bonding as to hold substrate 104 in place, but not so strong as to prohibit the removal of the substrate by applying a force to peel the substrate away from the backing. Suitable adhesives for this purpose are contact adhesives such as "Super 77" from 3M Corp. of St. Paul, Minn.

At step 202, conductive polymer rear electrode 106 is applied onto a front surface 118 of substrate 104, preferably by printing. Electrode 106 may be applied generally as a sheet layer covering the entire substrate 104, or may be patterned in a specific arrangement on substrate surface 118 to cover only the area desired to be illuminated (i.e. the surface area covered by the light emitting layer 110). Preferably, electrode 106 is made from polyethylene-dioxithiophene, which can be applied by screen printing to form a layer thickness in the range of approximately 0.1 and 50 microns (1 micron=$1\times 10^{-6}$ meters).

Dielectric layer 108 is then applied onto substrate surface 118 over the rear electrode 106, preferably by printing, at step 203. As an example, dielectric layer 108 comprises a material having a high dielectric constant, such as barium titanate dispersed in a polymeric binder to form a screen printable ink. More than one dielectric layer may be applied to better isolate the rear electrode 106 from other components of the electroluminescent panel 102 and reduce the risk of short circuiting. In addition, if better insulative properties are needed from the dielectric, an insulative coating may be applied over the dielectric layer 108 to further reduce the risk of contact between conductive components of the EL panel 102. As with rear electrode 106, dielectric layer 108 may cover the entire substrate surface or merely the area desired to be illuminated. Preferably, to reduce the risk of short circuiting of the EL panel 102 from the conductive layers 106, 112, 114 coming into contact with one another, dielectric layer 108 is configured to extend outward along the substrate surface 118 beyond the illumination area by approximately 1/16 inches to 1/8 inches. In an exemplary embodiment, dielectric layer 108 may be applied on the substrate surface 118 to have a thickness of between approximately 15 to 40 microns. In an alternative embodiment, dielectric layer 108 may be omitted from the EL panel 102 if light emitting layer 110 is an organic material, such as light emitting polymer, that exhibits properties of a dielectric material.

At step 204, light emitting layer 110 is applied onto substrate surface 118 over dielectric layer 108, preferably by printing. The surface area dimensions of the layer 110 define the illumination area for the electroluminescent panel 102 (e.g., the letter "L", a logo or icon image, etc.). Light emitting layer 110 may be formed of either organic (i.e. light emitting polymers) or non-organic materials, and preferably is a phosphor layer of electroluminescent particles, e.g., zinc sulfide doped with copper or manganese which are dispersed in a polymeric binder, and having a thickness of about 0.1 to 100 microns. However, the chosen material will depend on the illumination application desired and the power source available to energize the conductors, as light emitting polymers and other organics do not require as high an illumination voltage as non-organic illumination materials.

The conductive polymer chosen for front conductive polymer layer 112 is one that is light-transmissive (i.e. transparent or translucent) such that the illumination provided by light emitting layer 110 may be viewed above electroluminescent panel 102 by an observer. Preferably, the material forming layer 112 is polyethylene-dioxithiophene. At step 205, conductive polymer layer 112 is applied onto substrate surface 118 over light emitting layer 110. Conductive polymer layer 112 extends outward along the substrate surface 118 at least to cover light emitting layer 110, but preferably not beyond the perimeter of dielectric layer 108. In this way, conductive polymer layer 112 works in conjunction with electrode 106 to provide a consistent electric field across the entire surface of the light emitting layer to ensure even illumination of the EL panel 102. Conductive polymer layer 112 preferably has a thickness between about 0.1 to 100 microns, and is preferably applied by printing layer 112. If dielectric layer 108 extends substantially beyond a perimeter of the rear electrode, conductive layer 112 may extend outward along dielectric layer 108 a greater distance than the perimeter of rear electrode 106.

At step 206, front electrode lead 114 is placed into electrical contact with front conductive polymer layer 112 and is configured to transport energy to such layer. In a preferred arrangement, front electrode lead 114 extends substantially or completely around the perimeter of the conductive polymer layer 112 to ensure that electrical energy is essentially evenly distributed across layer 112. This configuration provides front electrode lead 114 as a front outlying electrode. Optionally, if conductive layer 112 extends beyond the perimeter of rear electrode 106, front electrode lead 114 may be positioned such that it does not substantially overlap the inwardly disposed rear electrode 106. Front electrode lead 114 is typically a 1/16 inch to 1/8 inch wide strip and approximately 2 to 20 percent of the width of conductive polymer layer 112, and may be positioned to directly overlie one or more of the conductive layer 112, dielectric layer 108, or substrate front surface 118. Preferably, front electrode lead 114 is made of a transparent conductive polymer such as polyethylene-dioxithiophene allowing lead 114 to overlap conductive polymer layer 112 and light emitting layer 110 without impeding the viewing of the EL panel illumination. Preferably, lead 114 is printed.

Figure 5:
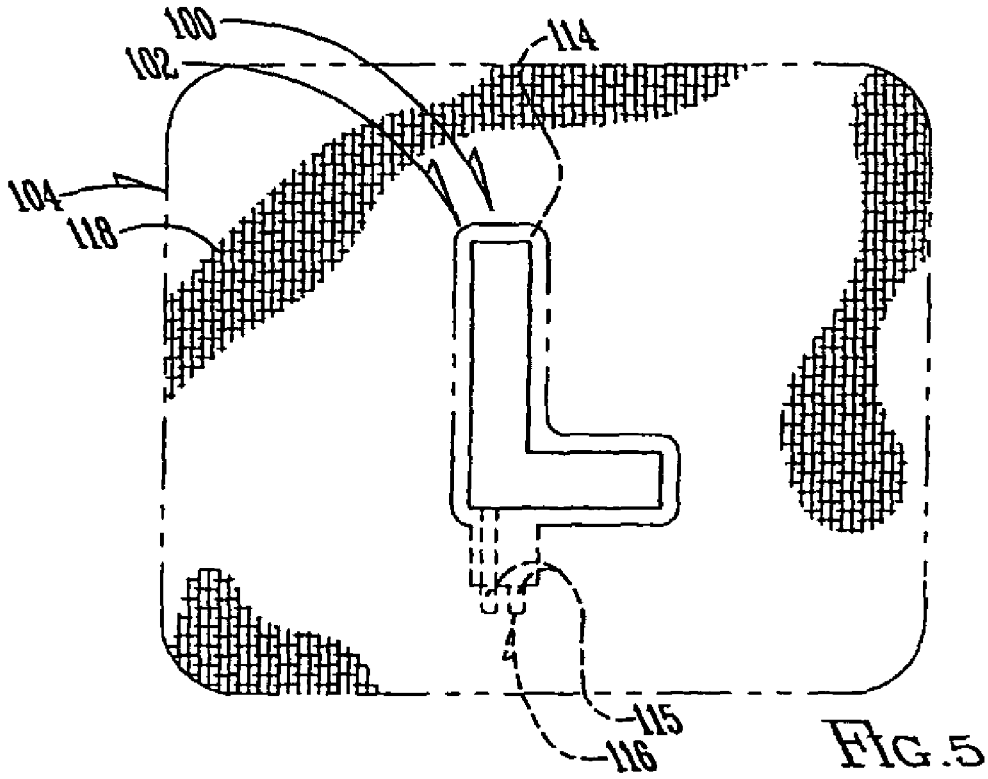
FIG. 5 is a top plan view of the illuminated display system in accordance with an embodiment of the present invention showing a substrate and electroluminescent panel formed thereon.

At step 207, conductive pads 116 are electrically connected to front electrode lead 114 and conductive polymer rear electrode 106 to supply electrical energy to EL panel 102 from a power source (not shown). As seen in FIG. 5, conductive pads 116 may be printed onto substrate 104 as lead tails 115 extending to the perimeter of the substrate 104, or may be fabricated as interconnect tabs extending beyond the substrate to facilitate connection to a power source or controller. Preferably, conductive pads 116 are made of silver to provide a reliable electrical conductor.

In a preferred aspect where substrate 104 is a fabric section, the illuminated display system 100 is placed in an oven to cure for 2.5 minutes at approximately 200 degrees Fahrenheit at step 208. This temperature ensures proper curing of the electroluminescent panel 102 components while not distorting or damaging the fibers of the fabric. The system 100 is then removed from the oven.

At step 209, and in the aspect where the substrate is attached to a rigid backing, substrate 104 is then removed from the backing, preferably by peeling substrate 104 away from the backing, to reveal the integrated EL panel 102 and substrate 104 as illuminated display system 100.

Optionally, a background layer or sign substrate (not pictured) having certain transparent and optically opaque areas can be placed over the EL panel as taught in the '391 patent to form a specific illuminated design. The background layer may, for example, be formed of number of colored printable inks. Further, an insulative protective layer, such as an ultraviolet coating or a urethane layer, may be placed over EL panel 102 and onto the substrate rear surface 120 to reduce the risk of electrical shock from a person coming into contact with conductive elements of the illuminated display system 100.

In accordance with another embodiment, any of conductive polymer rear electrode 106, front conductive polymer layer 112, and front electrode lead 114 may be formed of material other than a conductive polymer so long as at least one of rear electrode 106, conductive layer 112 and lead 114 is made of a conductive polymer. As an example, rear electrode 106 can be made of conductive materials such as silver or carbon particles dispersed in a polymeric ink; conductive layer 112 may be made of transparent conductive materials such as indium-tin-oxide; front electrode lead 114 may be made of the same materials as rear electrode 106, so long as lead 114 does not cover a significant portion of conductive layer 112 and thereby block the light emitted through layer 112.

It has been further determined that the above construction of illuminated display system 100 having all layers fabricated from transparent or translucent conductive polymer produces a device that acts as an electro-optical directional device. Using the arrangement of elements shown in FIG. 1, in an alternative embodiment, a semi-transparent display device 102 is prepared by first applying a conductive polymer film layer to substrate 104 to form rear electrode 106. In this embodiment, substrate may be either a non-fabric material such as polycarbonate film, or a fabric. A dielectric film layer 108 (e.g., barium titanate dispersed in a polymer matrix) is then deposited on top of rear electrode 106, followed by a light emitting film layer 110 and a second layer of conductive polymer film to form front conductive layer 112. In an exemplary embodiment, light emitting layer 110 comprises a phosphor layer of electroluminescent particles, e.g., zinc sulfide doped with copper or manganese which are dispersed in a polymer matrix. Upon application of a voltage (a square wave of approximately 380 volts p-p at approximately 400 HZ) across rear electrode 106 and front conductive layer 112, the device emits light mostly in the direction shown by arrow 130 in FIG. 1.

All layers of transparent or translucent when viewed therethrough in at least one direction when the EL panel is being powered for illumination. When the display is placed front-side down on a high contrast printed surface (e.g., newsprint, map, etc.), the printed image is clearly visible by an observer looking from the backside of the device through the dielectric. Light is reflected off the surface of the object back through the layer stack to the observer. For example, when a power source is provided to electroluminescent panel 102 to cause light emitting layer 110 to illuminate, items positioned below system 100 when front conductive polymer layer 112 is positioned face down on such items are illuminated and viewable through EL panel 102. Conversely, when front conductive polymer layer 112 is positioned face up in relation to the item located directly below substrate 104, system 100 is optically opaque, preventing the viewing of the item through EL panel 102. The present method is suitable for fabricating devices that are screen printed onto non-fabric materials such as polycarbonate film, as well as fabric sections. This type of illumination method may also be used as a light source for E-ink or other electrochromic display devices with high contrast.

Figure 3:
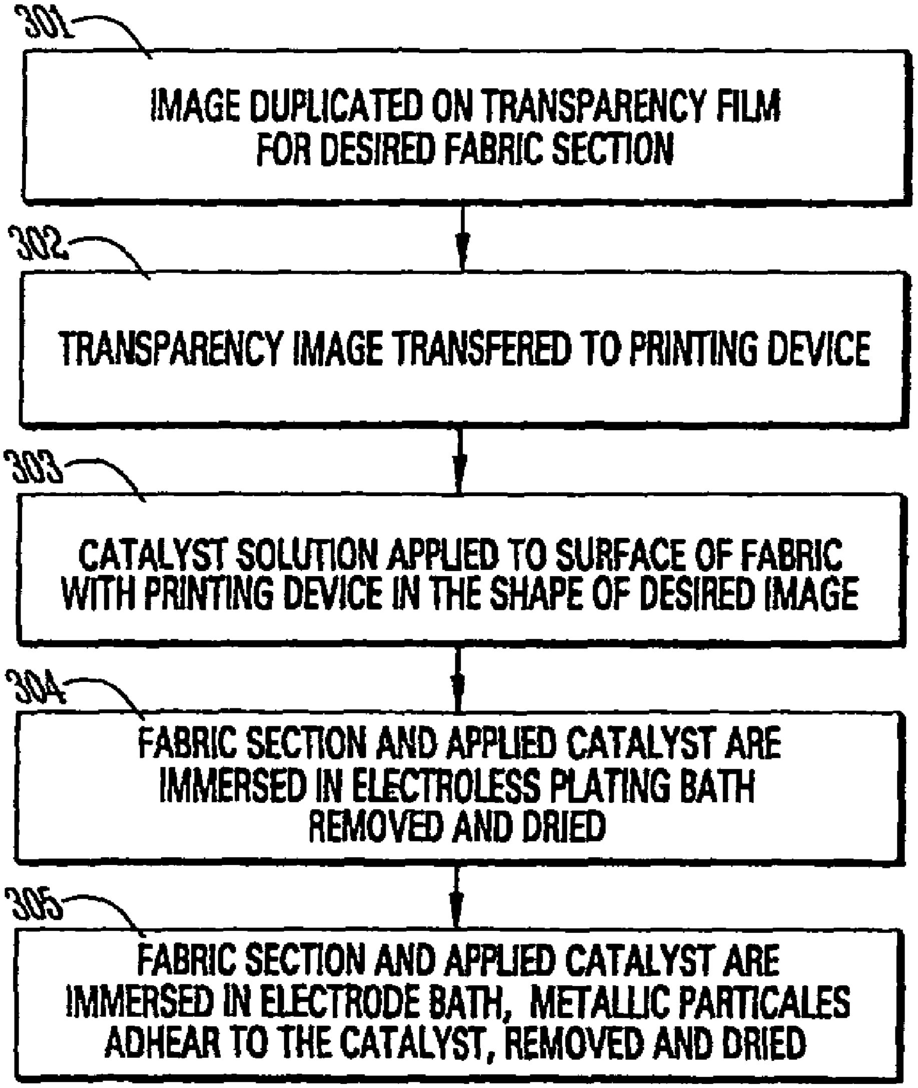
FIG. 3 is a flowchart illustrating an exemplary process for performing the metalization of a fabric substrate section in accordance with an embodiment of the present invention.

FIG. 3 shows the process steps to perform the metalization of a fabric substrate section. Once the metalization process is complete, thereby forming a rear electrode of an electroluminescent panel, the remaining EL panel components can the be built onto the metalized fabric section to form an illuminated display system. Suitable metals for use in the metalization process are those that serve as both good electrodes and also have the capability of being coated onto fabrics using standard electroless plating procedures. Examples of metals that are suitable for this process include copper, nickel, and other metals exhibiting similar characteristics. The use of fabrics as substrates upon which the rear electrode and other EL panel components are formed allows the rear electrode to efficiently bond to the fabric fibers, forming a more integral structure. Suitable fabric or textile materials include cotton, nylon (e.g., rip-stop), polyester, high-density polyethylene (e.g., Tyvek brand from DuPont Company of Wilmington, Del.), and the like. The metalization process employs the use of an electrodes plating bath and a conductor bath to form a thin, flexible, conductive electrode in a defined shape integrated with a section of fabric.

In accordance with one embodiment, an image, such as a word, logo, icon, etc., is generated on a film transparency at step 301. This image corresponds to the area desired to be illuminated by an electroluminescent panel. The transparency chosen should be one that may be used by a printing device to burn the image into a photographic emulsion and may include transparencies made from plastics, polycarbonates, and similar materials. As an example, the image may be generated on the transparency using a computer graphics program.

At step 302, the film transparency with the image thereon is burned into a photographic emulsion, so that the image may be used with a printing device, such as a screen printer.

At step 303, the printing device is positioned over the fabric section and a catalyst solution is applied to a surface of the fabric. In this way, the catalyst solution will be positioned on the fabric section in the shape of the desired image. It should be noted that steps 301 and 302 may be omitted if a device besides a printing device is used to apply the catalyst solution to the fabric in the shape of the image.

The fabric section with catalyst thereon is then immersed in an electroless plating bath at step 304. This step allows a chemical reduction to occur in the bath. It is not necessary for the entire fabric section to be immersed in the bath, merely the portion of fabric section with the catalyst. The fabric section is then subsequently removed and allowed to dry.

At step 305, the fabric section and applied catalyst are immersed in an electrode bath, preferably an aqueous solution containing metallic particles such as copper, nickel, or other metals exhibiting similar conductive characteristics. The metallic particles then migrate through the bath to the catalyst, depositing on the fabric surface in the shape of the image. As with the electroless plating bath, it is only necessary to immerse the portion of fabric section with the catalyst into the electrode bath. The fabric section then subsequently removed and allowed to dry.

As a result of these process steps, a fabric section is formed with a rear electrode thereon that is electrically conductive in the pattern of the image (i.e. in the desired illumination area). The rear electrode formed from this process typically has a thickness of between approximately 0.1 and 100 microns. The remaining layers of an electroluminescent panel, including the dielectric layer, the light emitting layer, the transparent conductive layer, and the front electrode lead, may be formed onto the rear electrode as discussed in steps 203-207 of FIG. 2 regarding the conductive polymer illuminated display. Additionally, the transparent conductive layer and front electrode layer may be made of either conductive polymers, or inorganics, such as indium-tin-oxide for the transparent conductive layer and silver or carbon particles dispersed in a polymeric binder for the front electrode lead. In addition, an insulative protective layer, such as an ultraviolet coating or a urethane layer, may be placed over EL panel components and onto the fabric substrate rear surface 120 to reduce the risk of electrical shock from a person coming into contact with conductive elements of the illuminated display system 100. When an electric potential is applied across the rear electrode and the front electrode lead, the light emitting layer will illuminate in the pattern of the image formed by the rear electrode. The rear electrode produced by this process is pliable and can be applied to fabric more easily that a typical silver or carbon electrode. Thus, such a rear electrode design will prolong the life of an EL panel system attached to an article of fabric.

Insulative Layer Formation

Figure 4:
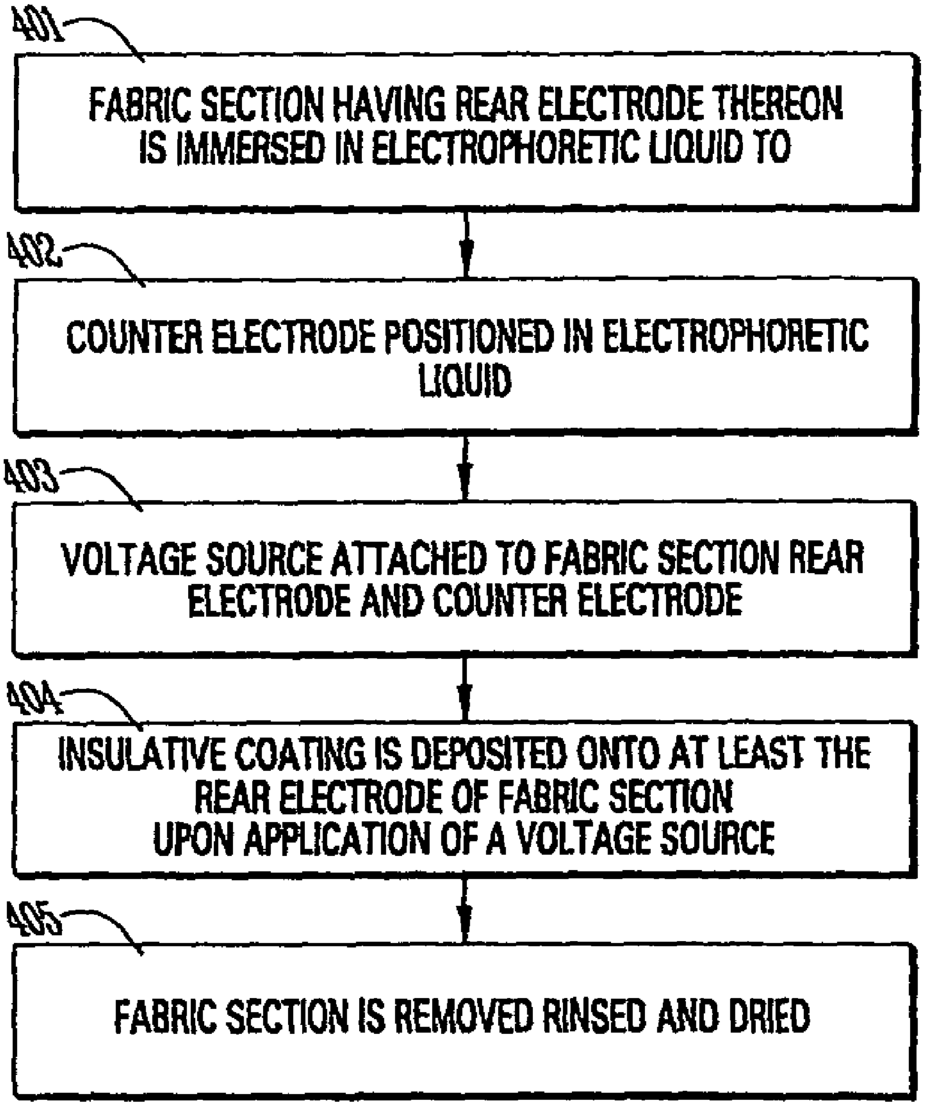
FIG. 4 is a flowchart illustrating an exemplary process forming an insulative layer onto a fabric substrate section in accordance with an embodiment of the present invention.

Subsequent to performing the process for the metalization of a fabric substrate section, an insulative layer may be applied to the fabric substrate section to encapsulate the fabric, providing uniform insulation and reducing the risk of electric shock or short circuit of an electroluminescent panel formed onto the fabric section. However, it is to be understood that the insulative layer formation process may be used with fabric section having rear electrode formed thereon by a process other than the fabric metalization process described above. Once the insulative layer is formed onto the fabric section, it serves as a dielectric layer, allowing the remaining EL panel components to be built thereon to form an illuminated display system. Suitable fabric materials for this process include cotton, nylon (e.g., rip-stop), polyester, high-density polyethylene (e.g., Tyvek brand from DuPont Company of Wilmington, Del.), and the like. The process steps for forming the insulative layer are shown in FIG. 4.

Figure 6:
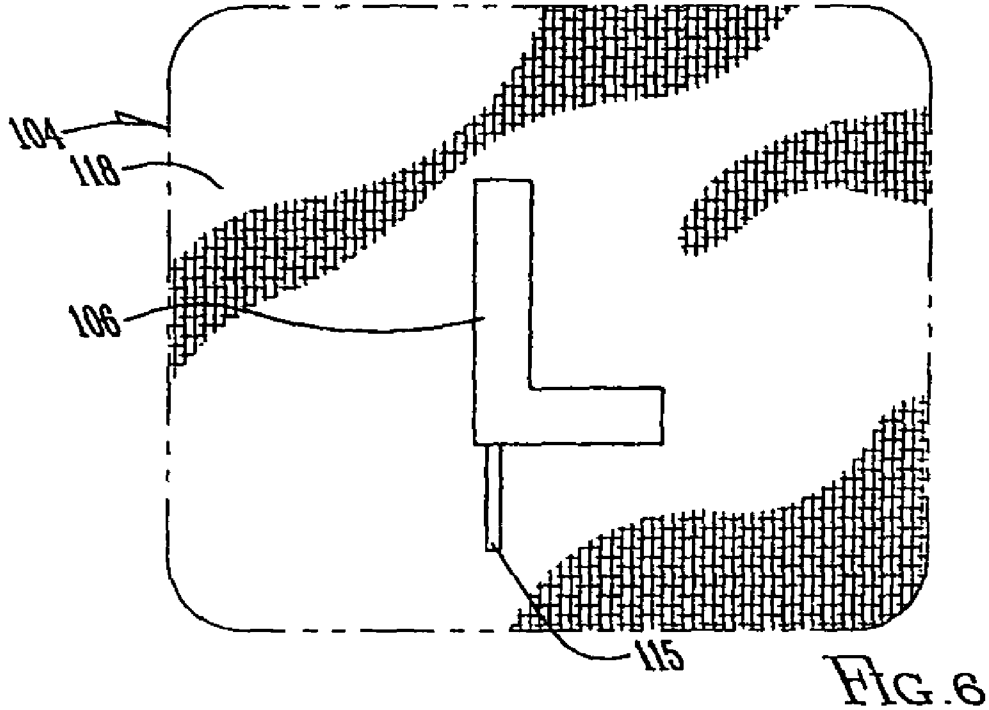
FIG. 6 is a top plan view of a rear electrode formed onto a fabric substrate section system in accordance with an embodiment of the present invention.

At step 401, the fabric section having the rear electrode formed thereon is immersed in a vessel containing electrophoretic liquid. If desired, the entire fabric section may be immersed in the electrophoretic liquid to form an insulative layer over the entire fabric section, not merely the portion where the rear electrode is located. However, as shown in FIG. 6, a small area of a lead tail 115 of the rear electrode 106, preferably about 0.25 inches in length and width, should be covered so as to avoid exposure to the electrophoretic liquid to enable a conductive pad 116 to be attached thereto to bring electrical energy to the rear electrode 106.

A counter electrode is positioned in the electrophoretic liquid adjacent to the fabric section at step 402. The counter electrode can be made of any conductive material, e.g., a metal such as copper or nickel. In this way, the electrophoretic liquid vessel has two electrodes positioned therein: the rear electrode of the fabric section and the counter electrode.

At step 403, a voltage source, such as a DC power supply (or a battery), is attached to the fabric section rear electrode and the counter electrode. A first lead of one polarity (i.e. positive or negative) electrically connects the voltage source to the rear electrode and a second lead of opposite polarity of the first lead electrically connects the voltage source to the counter electrode. The first lead preferably connects to the area of the lead tail 115 that is covered from exposure to the electrophoretic liquid.

At step 404, the voltage source creates a potential difference between the fabric section rear electrode and the counter electrode, causing the flow of electrical energy through the electrophoretic liquid. This process causes an insulative conformal coating to deposit onto at least the rear electrode of the fabric section, and preferably, onto the entire fabric section that is immersed in the electrophoretic liquid. The insulative coating will typically be formed onto the fabric section at a thickness between approximately 0.1 and 100 microns.

At step 405, the fabric section is removed from the electrophoretic liquid, and then rinsed and allowed to dry. Optionally, an insulating protective layer, such as an ultraviolet coating or a urethane layer, may be formed on both sides of the fabric over areas having a metal coating or conductor to protect persons who touch the fabric from electrical shock.

The insulative conformal coating provides a number of benefits in forming an electroluminescent panel onto a fabric section. First, the coating maintains the integrity of the rear electrode and electrically insulates such electrode on both the front and rear surfaces of the fabric section, thereby mitigating the risk of electrical shock for a person touching the fabric. Also, the coating may encapsulate the entire fabric section immersed in the electrophoretic liquid, thereby providing uniform insulation to eliminate short circuiting from other conductive elements of an EL panel formed onto the fabric. Furthermore, the process shortens the manufacturing of an EL panel in that the insulating barrier can serve as a dielectric layer, whereby the light emitting layer, the transparent conductive layer, and the front electrode lead are applied thereon as discussed in steps 204-207 of FIG. 2 regarding the conductive polymer illuminated display. Additionally, and as with the metallized fabric process, the transparent conductive layer and front electrode layer may be made of either conductive polymers, or inorganics, such as indium-tin-oxide for the transparent conductor and silver or carbon particles dispersed in a polymeric binder for the front electrode lead. When an electric potential is applied across the rear electrode and the front electrode lead, the light emitting layer will illuminate in the pattern of the image formed by the rear electrode.

The invention thus attains the objects set forth above, among those apparent from preceding description. Since certain changes may be made in the above systems and methods without departing from the scope of the invention, it is intended that all matter contained in the above description be interpreted as illustrative and not in a limiting sense.

What is claimed is:

1. An integrated illuminated display and substrate, comprising:

a textile substrate section;

a conductive polymer rear electrode layer comprising polyethylene dioxithiophene formed onto the textile substrate section;

a dielectric layer formed onto the conductive polymer rear electrode layer;

a light emitting layer formed onto the dielectric layer;

a front conductive polymer layer formed onto the light emitting layer; and a front electrode lead connected to the front conductive polymer layer.

2. The display of claim 1, wherein:

the conductive polymer rear electrode layer is printed onto the textile substrate section;

the dielectric layer is printed onto the conductive polymer rear electrode layer;

the light emitting layer is printed onto the dielectric layer; and the front conductive polymer layer is printed onto the light emitting layer.

3. The display of claim 1, further comprising two or more conductive pads, one of the pads electrically connected to the front electrode lead and another one of the pads electrically connected to the conductive polymer rear electrode layer to provide electrical contacts for a power source.

4. The display of claim 1, wherein the front conductive polymer layer is substantially transparent.

5. The display of claim 1, wherein the textile substrate section is made from materials comprising at least one material selected from the group consisting of cotton, polyester, nylon, and high-density polyethylene.

6. The display of claim 1, wherein the light emitting layer is a phosphor layer.

7. The display of claim 1, wherein the light emitting layer is a light emitting polymer layer.

8. The display of claim 1, wherein the front electrode lead is a conductive polymer front outlying electrode layer substantially surrounding a perimeter of the transparent conductive polymer layer.

9. The display of claim 1, wherein the front electrode lead is formed directly onto at least one of the substrate sections, the dielectric layer, and the front conductive polymer layer.

10. The display of claim 1, wherein the front conductive polymer layer is polyethylene-dioxithiophene.

* * * * *

UNITED STATES PATENT AND TRADEMARK OFFICE

CERTIFICATE OF CORRECTION

PATENT NO. : 7,745,018 B2 
APPLICATION NO. : 11/269225
DATED : June 29, 2010
INVENTOR(S) : Matthew M. Murasko and Patrick J. Kinlen It is certified that error appears in the above-identified patent and that said Letters Patent is hereby corrected as shown below:

Col. 7, Line 32-33, replace the term "electrodes" with the term -- electroless --

Signed and Sealed this

Twenty-sixth Day of October, 2010

David J. Kappos
*Director of the United States Patent and Trademark Office*